2,813,085

AQUEOUS CEMENTITIOUS COMPOSITION CONTAINING AN ALKALI METAL SILANOL SALT

Clinton W. MacMullen, Hamden, Conn., and Alfred Marzocchi, Pawtucket, R. I., assignors to Cowles Chemical Company, Cleveland, Ohio, a corporation of Ohio No Drawing. Application January 27, 1954,
Serial No. 406,588

14 Claims. (Cl. 260—29.2)

This invention relates to coating compositions for producing water repellent cementitious coatings and is more particularly concerned with the modification of known cementitious coating compositions, such as cement paint, stucco, plaster and the like, to render water repellent coatings produced by such compositions and also to improve such characteristics as the gloss and hardness of the coatings. The present application is a continuation-in-part of our prior application Serial No. 202,567, filed December 23, 1950, now abandoned.

Cementitious coating materials of the type indicated are commonly made by adding water to a dry, finely divided cement, such as Portland cement, which may or may not be mixed with sand, and the quantity of added water is regulated to produce a slurry or paste of a consistency suitable for application to a wall or similar surface. The consistency of the slurry varies according to the manner in which it is to be applied to the surface to be coated. Thus if it is to be used as a paint and applied by spraying, brushing or the like a relatively fluid consistency is desirable, whereas, if the composition is to be applied by troweling or a like procedure, a paste-like consistency is desirable. The word "slurry" as used herein is intended to comprehend aqueous cementitious mixtures having such relatively widely varying consistencies.

The problem of incorporating in a cementitious slurry of this type a material capable of rendering the resulting coating water repellent presents certain difficulties. For example, if a water repellent substance is mixed with the dry cement, the repellency of the added agent tends to prevent wetting of the cement with the water and hence makes difficult the preparation of the desired slurry. On the other hand, if the slurry is first prepared and the water repellent agent added thereto it is difficult to achieve the necessary degree of dispersion of the water repellent agent. Hence, prior efforts to produce an aqueous cementitious slurry capable of yielding a water repellent coating have not been particularly successful.

It is an object of the present invention to provide an aqueous cementitious slurry of a composition such that when it is applied to a surface to form a coating in the usual manner, the coating will have improved water repellent properties. It is a further object of the invention to provide a cementitious composition capable of producing a water repellent stucco finish of improved gloss and hardness. Other objects of the invention will be in part obvious and in part pointed out hereafter.

We have found that the objects of the present invention can be achieved by incorporating in a cementitious slurry a small proportion of an aqueous alkaline solution of the hydrolysis products of an organo-trihalosilane. Organo-silicon solutions capable of being used in accordance with the present invention can be prepared in any of a variety of ways. For example, one group of organosilicon solutions that has been found useful is disclosed in MacMullen application Serial No. 782,683, filed October 28, 1947, now abandoned, and MacMullen Patent 2,587,636. In this prior application and patent it is disclosed that any of various organo-trihalo-silanes can be hydrolyzed under certain conditions in aqueous alkalis to produce clear solutions containing substantial amounts of soluble salts of organo-silicon compounds. In most cases the hydrolysis products are a mixture of the alkali metal salts of organosilane triols and organo-siloxanols. The hydrolysis products can be conveniently defined by the general formula $[(R\,Si)_{n+1}O_n](OM)_{n+3}$ wherein R is an organic radical, $n$ is selected from the group consisting of zero and the positive integers, and M is an alkali metal. Such products are alkali metal salts of silanols. In order to secure a good yield of the desired soluble product, the hydrolyzing solution should contain at least about 5% by weight of the alkali, preferably an alkali metal hydroxide, and the proportion of alkali should be such that there are at least about eight equivalents of alkali per mol of trihalosilane to be hydrolyzed.

In accordance with an alternative procedure an organohalosilane can be hydrolyzed with water to produce an insoluble organosilicon precipitate and the precipitate then dissolved in a suitable alkali such as an aqueous alcoholic solution of an alkali metal hydroxide to produce aqueous alkali metal salts of silanols that are useful in the present composition. The alcohol of the solvent is preferably removed by distillation before the organosilicon solution is incorporated in the cement slurry.

The hydrolysis product used in the present composition may be produced from any of a large variety of organohalosilanes. Thus, the organic radical may be an alkyl radical such as butyl, amyl, nonyl or lauryl or an aryl radical such as ethylphenyl, amylphenyl or methylbenzyl, or an alkenyl radical such as allyl, methallyl or butenyl.

It has been found that if a relatively small amount of the organosilicon solution as thus prepared is incorporated in a cementitious slurry and the slurry used to coat a surface in the usual manner, the resulting coating exhibits good water-repellent properties. The products of the hydrolysis processes outlined above are aqueous alkaline solutions containing dissolved therein up to a few percent of the organo-silicon salt. In preparing the composition of the present invention the organosilicon solution is desirably mixed with the water used in preparing the cementitious slurry. As pointed out in the above-identified MacMullen application and patent, organo-silicon salts prepared as described above have the property of lowering the surface tension of the solutions in which they are dissolved and therefore their presence in the water used to prepare the cementitious slurry improves the wetting properties of the water and increases the ease with which the slurry can be prepared. The slurry is applied to the surface to be coated in the usual manner and after the water has evaporated from the coating it is found that the coating is water repellent.

While the exact nature of the change that occurs in the organosilicon salts during the drying of the coating is not known, the fact that they produce a water repellent effect in the coating may perhaps be explained as follows: It is known that organo-halo-silanes when hydrolyzed with water, as distinguished from aqueous alkalis, under the conditions indicated above condense and polymerize to form silicone resin. Hence, it is probable that a somewhat similar action takes place during drying and aging of coatings produced from the present composition, that is to say, the organo-silicon salt upon evaporation of the water from the coating condenses and polymerizes to form insoluble polymers, similar to silicone resins, which are highly water repellent.

The organo-silicon solution may be incorporated in the slurry either by mixing the solution with water that is to be mixed with the cement or by preparing a cement slurry and mixing the organo-silicon solution therewith. In either case the improved wetting properties of the organo-silicon solution render its incorporation in the slurry a simple matter. In a case where the organosilicon solution is added after the preparation of the cement-water slurry or the cement-sand-water slurry, it is important to bear in mind that the solution contains only a few percent of organo-silicon solids and hence allowance must be made for the fact that in adding the organo-silicon solution to the slurry a considerable quantity of water is also being added. The amount of organo-silicon solution used varies somewhat according to the nature of the organo-radical and also according to the properties desired in the resulting coating, but in general should be used in such an amount as to produce a slurry containing between 0.05% and 1.5% by weight of organo-silicon salts.

In cases where the cementitious slurry is to be used to produce a stucco coating it has been found that the gloss and hardness of the resulting coating can be improved by incorporating into the slurry, in addition to the organo-silicon compound, a small proportion of an alkaline silicate such as, for example, sodium metasilicate. The metasilicate is desirably dissolved in the organo-silicon solution and added therewith to the cement or the slurry. The silicate is preferably used in such an amount as to produce a slurry containing from 0.25% to 2.0% by weight of the silicate and when so used has been found to improve significantly the gloss and hardness of the stucco coating without diminishing the water repellency of the coating.

In order to point out more fully the nature of the present invention, the following illustrative specific examples are given:

Example I 40 parts by weight of white Portland cement were mixed with 18.5 parts by weight of an aqueous alkaline solution of the products of the alkaline hydrolysis of amyl trichlorosilane with sodium hydroxide. The solution contained about 0.8% by weight of the organosilicon salt and thus the resulting mixture contained about 0.26% by weight of organo-silicon solids.

The cement and solution when thoroughly mixed formed a thin slurry which was applied by painting to the surface of a cinder block to form a coating thereon. The coating was allowed to age overnight in a high humidity room and then tested for water repellency by placing droplets of water thereon. The droplets of water failed to spread over the surface of the coating thus showing it to be water repellent.

Example II

A mixture was prepared of 40 parts by weight of cement, 18.5 parts by weight of an aqueous alkaline solution of the sodium amyl derivative of Example I of such a concentration as to produce in the finished slurry an amount of the organo-silicon salt equal to 0.16% by weight of the mixture. The cement and solution were thoroughly mixed as before and applied to the surface of a cinder block as a coating. After twelve hours of aging the coating was tested for water repellency and it was found that the coating was substantially as repellent as that of Example I, notwithstanding the fact that about only one-half as much of the organo-silicon compound had been used.

Example III

The procedure of Example I was followed except that the amount of solution used was increased to 20 parts by weight instead of 18.5 parts and the organo-silicon content of the solution was such as to make the concentration in the mixed slurry about 1.1% by weight. It was found that with increasing organo-silicon content the quantity of solution used had to be increased to yield a slurry of a given consistency. In the present case, the use of 20 parts by weight of the solution instead of 18.5 parts by weight gave a slurry having a consistency substantially the same as that of Example II.

The slurry prepared as described in this example was applied to a cinder block as a coating and aged for a period of about 12 hours. At the end of this period, the coating appeared somewhat grainy and the repellency was less than that of Example I. Moreover, the coating did not adhere to the surface of the cinder block as well as in Examples I and II.

Example IV

A slurry was prepared by mixing 20 parts by weight of cement, 20 parts by weight of sand, and 12 parts by weight of a solution containing 0.55% of the products of the alkaline hydrolysis of amyl trichlorosilane. This slurry when prepared contained about 0.13% by weight of organo-silicon solids.

The slurry as thus prepared was formed into a coating, aged from 1 to 3 days, and tested for water repellency. The repellency of this coating was comparable with that of the coatings of Examples I to III.

Example V

A slurry was made by first mixing 40 parts by weight of cement and 40 parts by weight of sand and then adding thereto 20 parts by weight of an aqueous solution containing 2.7% of sodium metasilicate and 0.9% of the sodium salts of the hydrolysis products of amyl trichlorosilane. The resulting slurry contained 0.18% of organo-silicon salt and 0.54% of the metasilicate.

This slurry was applied to a surface to form a coating and the coating dried. After sixteen days it was tested for water repellency and hardness and showed good gloss, fair glaze, good hardness and good water repellency.

Example VI

The procedure of Example V was followed except that the cement-sand mixture was made up of 20 parts by weight of cement and 60 parts by weight of sand. The resulting coating when tested was found to have a water repellency comparable with that of Example V but the gloss, glaze and hardness were inferior to the coating of Example V.

Example VII

The procedure of Example V was followed except that the composition of the solution was changed in such manner that the slurry contained 0.08% by weight of sodium amyl organo-silicon salts and 0.48% by weight of water glass. Coatings prepared from this slurry had good gloss, glaze and water repellency but their hardness was inferior to that of Example V.

Example VIII

A slurry was prepared by mixing 20 parts by weight of cement, 20 parts by weight of sand, and 11 parts by weight of a solution containing 0.41% of the products of the alkaline hydrolysis of nonyltrichlorosilane. This slurry when prepared contained about .09% by weight of organo-silicon solids.

The slurry thus prepared was formed into a coating on a cinder block, aged three days, and tested for water repellency. The coating thus prepared exhibited water repellency.

Example IX

A mixture was prepared consisting of 40 parts by weight of cement and 16 parts by weight of an aqueous alkaline solution containing 1.0% of the products of the alkaline hydrolysis of phenyltrichlorosilane. This slurry when prepared, contained about 0.3% by weight of the organosilicon product.

The slurry thus prepared was formed into a coating on a cinder block, aged about two weeks, and tested for water repellency. The coating thus prepared had good water repellency.

Example X

A mixture was prepared consisting of 40 parts by weight of cement and 16 parts by weight of an aqueous alkaline solution containing 1.1% of the products of the alkaline hydrolysis of benzyltrichlorosilane. This slurry when prepared contained about 0.3% by weight of the organosilicon product.

The slurry thus prepared was formed into a coating on a cinder block, aged about two weeks, and tested for water repellency. The coating thus prepared exhibited water repellency.

Example XI

A quantity of butyl trichlorosilane was hydrolyzed by mixing it with a large excess of water in known manner and the resulting precipitate of butyl silicone was filtered and washed with water. The butyl silicone was then dissolved in an aqueous alcoholic sodium hydroxide solution containing 13.4% by weight sodium hydroxide and 17.2% by weight of ethanol, after which the solution was heated to distill the alcohol therefrom. The resulting aqueous solution contained about 16.9% sodium butyl siliconate and 6.8% free sodium hydroxide.

This relatively concentrated solution was diluted with a sufficient amount of water to produce a 1% solution of the siliconate, and the diluted solution was mixed with Portland cement in an amount sufficient to form a slurry of pasty consistency. The slurry was spread on the sides of a common brick and allowed to dry and cure for a period of six days. At the end of this period the coated brick was tested for water repellency and found to have excellent repellency.

It is of course to be understood that the foregoing examples are illustrative only and that numerous changes may be made in both the components of the compositions set forth therein and in the relative proportions without departing from the scope of the invention. Thus the cementitious component of the slurry may be a Portland cement as illustrated, or it may be a conventional "cement paint" i. e., a dry mixture of cement with pigment, plasticizers, etc. adapted to be dispersed in water to form a paint for producing cementitious coatings. The cement may be mixed with sand as described or with a coarser aggregate. Other modifications within the scope of the invention will occur to those skilled in the art.

We claim:

1. A coating composition for producing water repellent cementitious coatings, said composition comprising an aqueous cementitious slurry having a solid phase comprising a hydraulic cement, the aqueous phase of said slurry having dissolved therein a small quantity of a water-soluble alkali metal salt of a hydrocarbon-substituted silanol.

2. A coating composition for producing water repellent cementitious coatings, said composition being an aqueous cementitious slurry having a solid phase comprising a hydraulic cement, the aqueous phase of said slurry having dissolved therein from 0.05 to 1.5% by weight of the slurry of a water-soluble alkali metal salt of a hydrocarbon-substituted silanol.

3. A coating composition for producing water-repellent cementitious coatings, said composition comprising an aqueous cementitious slurry having a solid phase comprising a hydraulic cement, the aqueous phase of said slurry having dissolved therein a small quantity of an alkali metal salt of the hydrolysis product of an organotrihalosilane wherein the organo substituent is a hydrocarbon radical attached to silicon.

4. A coating composition for producing water-repellent cementitious coatings, said composition being an aqueous cementitious slurry having solid phase comprising a hydraulic cement, the aqueous phase of said slurry having dissolved therein from 0.05 to 1.5% by weight of the slurry of an alkali metal salt of the hydrolysis product of an organotrihalosilane wherein the organo substituent is a hydrocarbon radical attached to silicon.

5. A coating composition for producing water-repellent cementitious coatings, said composition being an aqueous slurry comprising hydraulic cement and sand dispersed in water, said water having dissolved therein a small amount of an alkali metal salt resulting from the aqueous alkaline hydrolysis of an organotrihalosilane wherein the organo substituent is a hydrocarbon radical attached to silicon.

6. A coating composition for producing water-repellent cementitious coatings, said composition being an aqueous slurry comprising hydraulic cement and sand dispersed in water, said water having dissolved therein from 0.05 to 1.5% by weight of said slurry of an alkali metal salt resulting from the aqueous alkaline hydrolysis of an organotrihalosilane wherein the organo substituent is a hydrocarbon radical attached to silicon.

7. A coating composition for producing water-repellent cementitious coatings, said composition being an aqueous slurry of hydraulic cement and sand, the aqueous phase of said slurry having dissolved therein from 0.25% to 2.0% by weight of said slurry of an alkali metal silicate and from 0.05% to 1.5% by weight of said slurry of an alkali metal salt resulting from the aqueous alkaline hydrolysis of an organotrihalosilane wherein the organo substituent is a hydrocarbon radical attached to silicon.

8. A coating composition for producing water-repellent cementitious coatings, said composition comprising an aqueous cementitious slurry having a solid phase comprising a hydraulic cement, the aqueous phase of said slurry having dissolved therein a sodium salt resulting from the aqueous alkaline hydrolysis of an amyl trichlorosilane, said hydrolysis product being present in said composition to the extent of between 0.05% and 1.5% by weight of said composition.

9. A coating composition for producing water-repellent cementitious coatings, said composition comprising an aqueous cementitious slurry having a solid phase comprising a hydraulic cement, the aqueous phase of said slurry having dissolved therein a sodium salt resulting from the aqueous alkaline hydrolysis of a nonyl trichlorosilane, said hydrolysis product being present in said composition to the extent of between 0.05% and 1.5% by weight of said composition.

10. A coating composition for producing water-repellent cementitous coatings, said composition being an aqueous slurry of hydraulic cement and sand, the aqueous phase of which contains dissolved therein sodium metasilicate and the sodium salt of the aqueous alkaline hydrolysis of an amyl-trihalo-silane, said metasilicate being present in said composition to the extent of 0.25% to 2.0% by weight of the composition and said hydrolysis product being present to the extent of 0.05% to 1.5% by weight of the composition.

11. A coating composition for producing water-repellent cementitious coatings, said composition comprising an aqueous cementitious slurry having approximately the following composition: 40 parts by weight of white Portland cement, 18 parts by weight of water and 0.15 part by weight of an alkali metal salt resulting from the aqueous alkaline hydrolysis of an organotrihalo-silane wherein the organo substituent is a hydrocarbon radical attached to silicon.

12. A coating composition for producing water-repellent cementitious coatings, said composition comprising an aqueous cementitious slurry having approximately the following composition: 40 parts by weight hydraulic cement, 40 parts by weight sand, 20 parts by weight water, 0.18 part by weight of a sodium salt resulting from the aqueous alkaline hydrolysis of amyl trichlorosilane, and 0.54 part by weight of sodium metasilicate.

13. A coating composition for producing water-repellent cementitious coatings, said composition being an aqueous slurry of hydraulic cement and sand, the aqueous phase of said slurry having dissolved therein from 0.25% to 2.0% by weight of said slurry of an alkali metal silicate and from 0.05% to 1.5% by weight of said slurry of a water soluble alkali metal salt of a hydrocarbon-substituted silanol.

14. A coating composition for producing water-repellent cementitious coatings, said composition being an aqueous slurry of hydraulic cement and sand, the aqueous phase of said slurry having dissolved therein from 0.25% to 2.0% by weight of said slurry of sodium metasilicate and from 0.05% to 1.5% by weight of said slurry of a water soluble alkali metal salt of a hydrocarbon-substituted silanol.

References Cited in the file of this patent
UNITED STATES PATENTS

| | | |
|---|---|---|
| 2,441,423 | Elliot | May 11, 1948 |
| 2,491,487 | Faulwetter | Dec. 20, 1949 |
| 2,507,200 | Elliot | May 9, 1950 |